United States Patent
Bhat et al.

(10) Patent No.: US 9,237,422 B1
(45) Date of Patent: Jan. 12, 2016

(54) WIRELESS DEVICE DETECTION SYSTEM

(71) Applicant: Intelligent Automation, Inc., Rockville, MD (US)

(72) Inventors: Arvind Satyanarayan Bhat, Gaithersburg, MD (US); Zhitong Guo, Rockville, MD (US); Eric van Doorn, Frederick, MD (US)

(73) Assignee: Intelligent Automation, Inc., Rockville, MD (US)

( * ) Notice: Subject to any disclaimer, the term of this patent is extended or adjusted under 35 U.S.C. 154(b) by 0 days.

(21) Appl. No.: 14/215,652

(22) Filed: Mar. 17, 2014

Related U.S. Application Data

(60) Provisional application No. 61/792,155, filed on Mar. 15, 2013.

(51) Int. Cl.
*H04W 24/00* (2009.01)
*H04W 4/02* (2009.01)
*H04W 64/00* (2009.01)
*H04M 1/725* (2006.01)

(52) U.S. Cl.
CPC .............. *H04W 4/021* (2013.01); *H04W 64/00* (2013.01); *H04M 1/72519* (2013.01)

(58) Field of Classification Search
CPC .. H04W 48/04; H04W 64/00; H04M 1/72519
USPC .................. 455/456.1, 456.6, 550.1
See application file for complete search history.

(56) References Cited

U.S. PATENT DOCUMENTS

| | | | |
|---|---|---|---|
| 2003/0222819 A1* | 12/2003 | Karr et al. ...................... | 342/457 |
| 2009/0177383 A1* | 7/2009 | Tertoolen ...................... | 701/208 |
| 2010/0197222 A1* | 8/2010 | Scheucher .................... | 455/11.1 |
| 2011/0244887 A1* | 10/2011 | Dupray et al. ............. | 455/456.2 |
| 2013/0150814 A1* | 6/2013 | Buan ............................. | 604/318 |

\* cited by examiner

*Primary Examiner* — Danh Le
(74) *Attorney, Agent, or Firm* — Faegre Baker Daniels LLP

(57) ABSTRACT

A device for detecting wireless signals and locating the place of origin in a building is provided that includes a transmitter system using a cellular protocol; a plurality of antennae that receive wireless Radio Frequency (RF) signals, each antenna having a port; a receiving system connected to the antennae ports with a plurality of cables, converting the RF signal to voltage waveform; a processing system in communication with the receiving system, detecting the strength of the received signals and Time Difference of Arrival of the RF signals with respect to antennae and determining the location where the wireless signals are being emitted by using classification algorithms; and a human machine interface.

15 Claims, 3 Drawing Sheets

WIRELESS DEVICE DETECTION SYSTEM

This application claims priority from and is a non-provisional application of U.S. Provisional Application No. 61/792,155 filed on Mar. 15, 2013, the complete disclosure of which is incorporated herein by reference.

This invention was made with government support under Contract Nos. 2007-RG-CX-K179 and 2011-IJ-CX-K002 awarded by the National Institute of Justice; and Contract Nos. N00014-04-M-0253 and N00014-06-C-0044 awarded by the Office of Naval Research. The government has certain rights in the invention.

BACKGROUND OF THE INVENTION

This invention relates to a system for detecting and locating the place of operation of wireless devices such as cellular phones, and in particular, a system capable of detecting and locating the use of cellular phones in an area such as a prison where radio frequency (RF) antennae have been installed at various locations.

It can be very important to be able to detect the use of and location of wireless devices, such as cellular phones. One particular application where it can be very important to locate the use and operation of cell phones, and in particular, the use and operation of unauthorized cell phones, is in correction facilities. Numerous approaches have been undertaken to prevent unauthorized use of cell phones in correction facilities, but this has become a continuing problem, which has been difficult to address. Phones are smuggled in to inmates by guards or family members and activated using prepaid calling plans that are very hard to trace. Such unauthorized use poses a severe concern as criminals may contact gang members or others to plan and coordinate illegal activities including, but not limited to, buying drugs, elimination or intimidation of witnesses or competing gang members, and/or to plan escape attempts, all while behind bars.

One prior approach for controlling unauthorized dissemination and use of cell phones in correction facilities is to manage and carefully screen access. Such screening measures create additional costs and have been minimally effective. Accordingly, it is an object of the present invention to provide a system and method wherein the use of a cell phone in a monitored area is detected, and based upon the signals detected, the system can calculate and pinpoint or approximate the location where the cell phone or wireless device is being operated.

SUMMARY OF THE INVENTION

In one embodiment of the invention, a device for detecting wireless signals and locating the place of origin in a building is provided that includes a transmitter system using a cellular protocol; a plurality of antennae that receive wireless Radio Frequency (RF) signals, each antenna having a port; a receiving system connected to the antennae ports with a plurality of cables, converting the RF signal to voltage waveform; a processing system in communication with the receiving system, detecting the strength of the received signals and Time Difference of Arrival of the RF signals with respect to antennae and determining the location where the wireless signals are being emitted by using classification algorithms; and a human machine interface.

The transmitter system can be a modem(s) programmed through a computer to send out RF signals to provide training data sequences to the processing system. One of the antennae is denoted as the reference antenna.

The receiving system may have four channels and samples the RF signals and converts them to voltage using aliasing and band pass filtering. The device may further comprise communication means between the receiving system and processing system. The communication means can be implemented using Gigabit Ethernet.

The processing system may consist of a computer and signal processing software, wherein the signal processing software may further include preprocessing software. The preprocessing software filters voltage signals and determines features of the voltage signals. The features of the voltage signals may include signal strength and Time Difference Of Arrival to the antennae with respect to the reference antennae.

The signal processing software may further include classification software. Training data sequences can be used to provide statistical information of features of voltage signals. A supervised classification algorithm may determine the location in which usage of the wireless device occurred. A human machine interface may set an alarm and may provide an operator with visual information of the location in which the wireless device has been used.

BRIEF DESCRIPTION OF THE DRAWINGS

The above-mentioned and other features and objects of this invention and the manner of obtaining them will become more apparent, and the invention itself will be better understood by reference to the following description of embodiments of the present invention taken in conjunction with the accompanying drawing, wherein.

Figure 1:
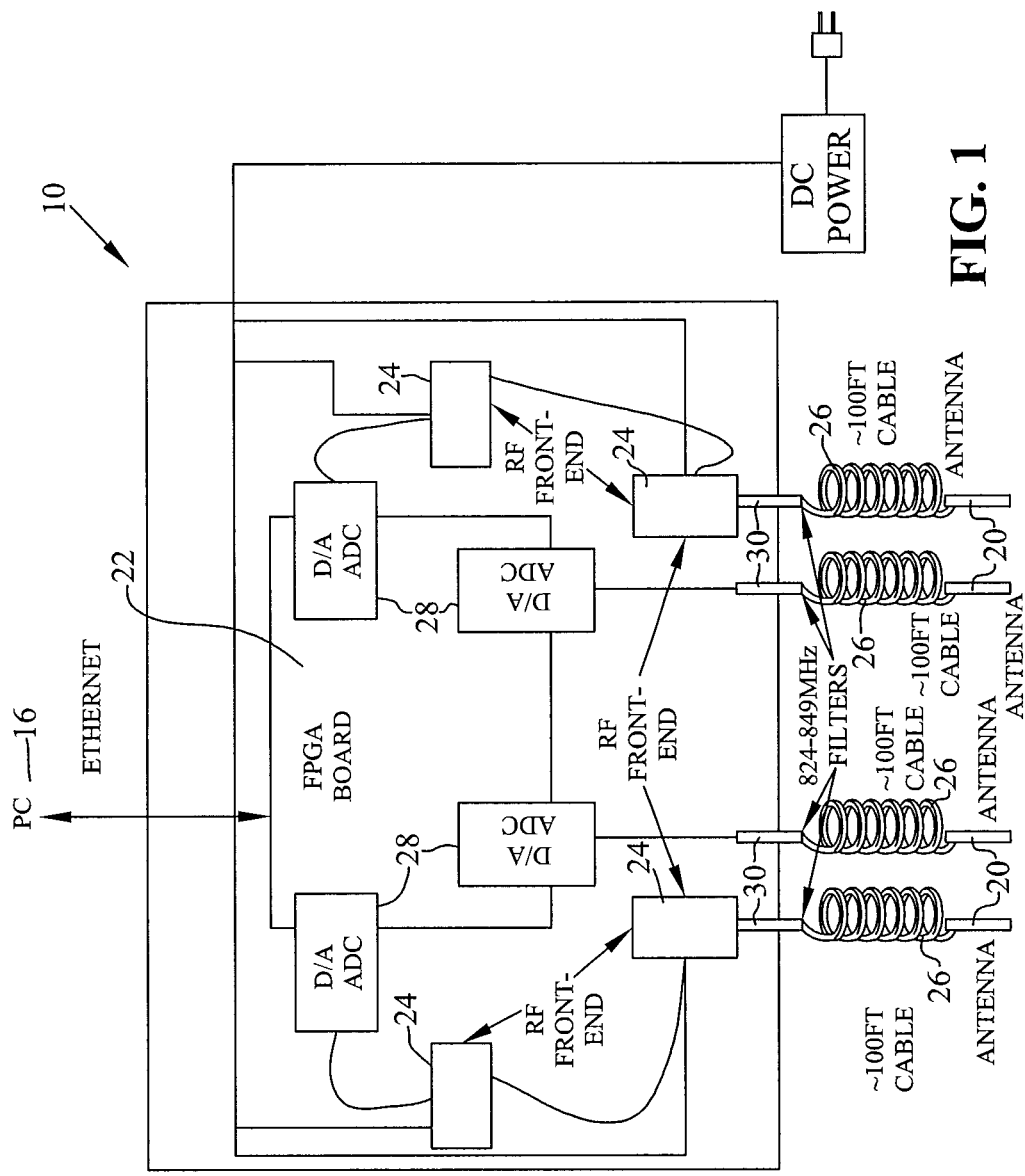
FIG. 1 is a schematic diagram of the functional components of the wireless device detection system.

Corresponding reference characters indicate corresponding parts throughout the several views. Although the drawing represents embodiments of the present invention, the drawing is not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purpose of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

Figure 2:
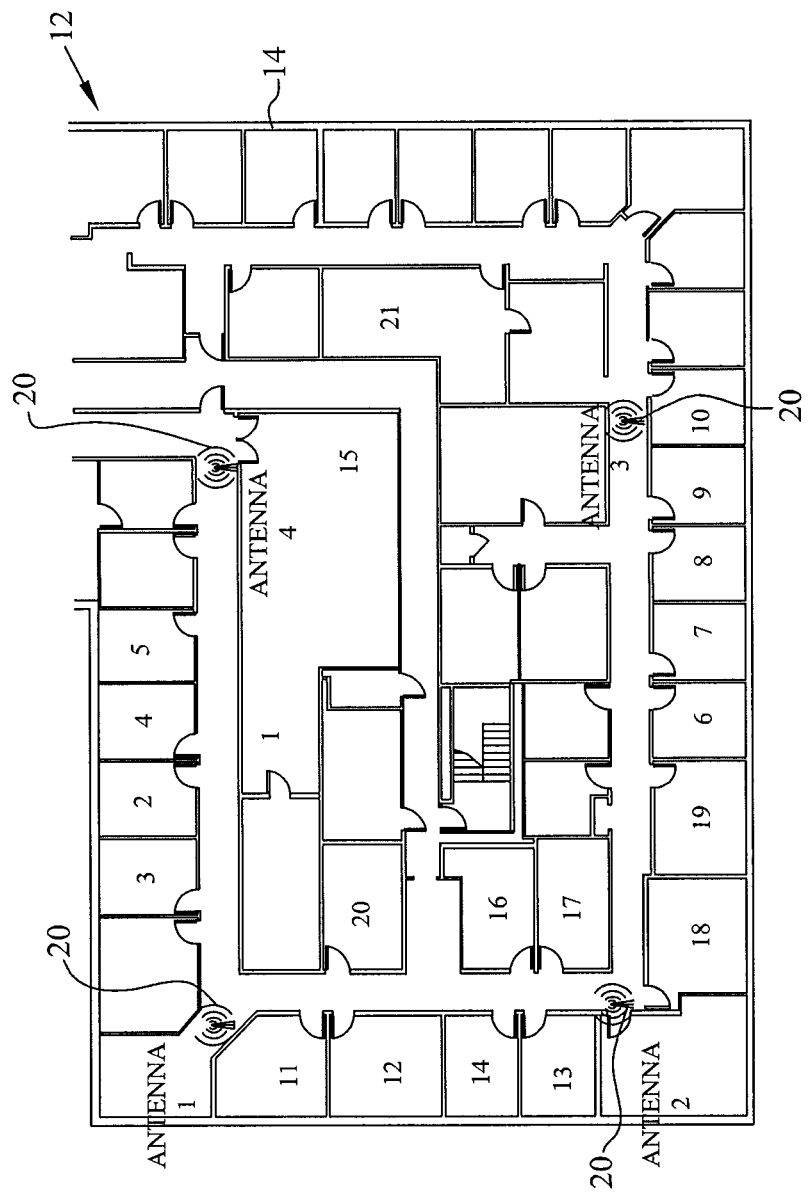
FIG. 2 is a map showing a layout of a building being monitored for cell phone use and location of the antenna to receive the transmitted signals.

Now referring to FIGS. 1 and 2, a system is depicted, generally indicated as 10, for detecting and locating the source of wireless signals. System 10 includes a plurality of antennae 20, which are placed at strategic locations in a building, generally indicated as 12 (see FIG. 2), wherein it is desired to detect the use and location of wireless devices. System 10 also includes a processor card 22 that in one embodiment may be a Field-Programmable Gate Array (FPGA) board. System 10 also includes four front end receiver cards 24 that each connect to one antenna 20 through electrical cables 26, which may be coaxial cables. Analog to Digital Converters (ADC) 28 interface between front end receiver cards 24 and the processor card 22. Filters 30 may also be placed between antenna 20 and receiver cards 24.

System 10 samples cellular bands at a high sampling rate simultaneously at different locations 20, and then uses signal processing methods to detect and locate the source of the signals. The present system has been found to be accurate within a few adjacent rooms or prison cells in a given building. To process the signals, the processor board 22 runs a real time detection algorithm, described more fully below. The antennae are placed inside the perimeter 14 of building 12 and are connected back to the board with coaxial cables 26. System 10 continually monitors/listens for wireless device usage/cell phone calls via down converting receivers 24. In one embodiment, system 10 listens for calls in the 800 MHz cellular band, but the system is also suitable for other major bands used in the U.S., such as 1700 or 1900 MHz, or other bands.

When a cell phone signal is detected, the signals are sampled at each antenna 20 and analyzed on a base computer 16. Specifically, an RF fingerprint is determined based on Time Difference Of Arrivals (TDOA) and received signal strengths. An RF fingerprint distilled from a specific detection is compared to a previously recorded database of fingerprints to locate the source of the signal/cell phone device.

The TDOA operates based on the time differences at which the cell phone signal reaches the different antennae. In open environments with little multipath, the measured TDOA corresponds to a geometric time-of-flight. This is not true for indoor settings, wherein many path obstructions and reflectors can be present. System 10 can measure time differences for Code-Division Multiple Access (CDMA) and Global System for Mobile (GSM) signals to better than 5 nsec (which corresponds to a distance of 5 feet); however, due to multipath, TDOAs cannot be used straightforwardly to locate the cell phone. Instead, system 10 uses RF fingerprinting based on the fact that RF signals emitted by a cell phone from a certain location, and received at another specific location are: 1) repeatable, 2) vary little if the phone location samples one room/cell, and 3) vary significantly from one room to another. RF fingerprinting is best suited to a high multipath environment, but it requires a thorough calibration at installation. It also can locate a cell phone to a specific prison cell.

Ray tracing is one simulation method that may be used to extend the current localization algorithm. Ray tracing algorithms, which can take full advantage of detailed knowledge of the 3D construction of a building when such information is available, can provide better performance at the cost of higher computational complexity and technical risk.

Filters 30 may be a $100^{th}$ order Finite Impulse Response (FIR) band-pass filter. Computation of signal strength is straightforward as it is defined as the absolute mean of received voltages. However, to get the TDOA between two received signals, the correlation peak of the signals must be determined. To do this, the received signals are correlated, after having gone through the $100^{th}$ order band-pass filters 30. It is difficult to find an accurate peak of this correlation function because it is both signal and negative and yet not down converted. Down conversion is not used because the channel, which the cell phone is transmitting on, is not known, and it is difficult in noisy conditions to determine this with enough accuracy to avoid phase wrapping. However, the channel frequency can be removed without knowing its exact value by low pass filtering the square of the correlated signal. The correlation must be squared in order to present a DC component to low pass filter. A sharp $400^{th}$ order FIR lowpass filter with a cutoff of half the baseband frequency (1.2288 MHz) is effective in removing the channel frequency from the signal. A last step is to smooth the correlation curve using a spline function. This is required because the received data is sampled at 62.5 MHz, or 16 nsec between samples, which does not provide enough resolution to find the time difference bound to the necessary sub-nsec resolution. The peak index of each filtered and smoothed correlation is found, and these indexes are converted to delays in nanoseconds using a linear function.

Before performing the analysis, it is best to remove outliers, although the criteria for classifying a reception as an outlier are based on heuristics, to some extent. The outlier removal process takes place in two steps. The first is to throw away any observation if any of the four receiving antennae gets the transmission outside the frequency band of interest (i.e., CDMA2000 channel number 490-530). This criterion is based on the fact that the modem is programmed to use the CDMA2000 channel 507. Once the outliers have been thrown away based on the channel information, the mean ($\mu^i_l$) and standard deviation ($\delta^i_l$) of a particular feature "i" obtained from a particular location "l." Then observations are thrown away where either of the seven feature values lies outside the ($\mu^i_l \pm 3\delta^i_l$) region. The two-step outlier rejection process provides a refined data set of size 5099 from a set of 5880 observations. In other words, 13 percent of the collected data has been rejected as outliers.

Once the data have been gathered, free from outliers, classification algorithms can be used to achieve the classification goal. All but one approach solves the classification by maximizing the posterior probability. Both linear and non-linear classification methods are used.

A sample test of system 10 was set up in building 12 shown in FIG. 2. A cellular modem (multitech MTCBA-C1), using the CDMA 2000 protocol over the Verizon network, was used as a transmitter as well as several Verizon phones. As shown in FIG. 2, antennae 20 were located approximate the corners of building 12. Note, as the same hardware is used to sample all four channels, synchronization is not an issue after calibrating for small differences in the length of cables 26. Although building 12 used for the test is not a correctional institution environment, it is similar in that: there is no line of sight between the transmitter and receiving antennae, and the environment is not static (i.e., doors open and close and furniture and other items are moved around periodically). Building 12 is different from a correctional institution/prison; however, in that a prison has metal doors instead of wood, concrete walls instead of drywall/wood, and larger open spaces or hallways. In spite of the differences, building 12 is still suitable and convenient to collect a large amount of data for making conclusions regarding the suitability of the subject invention.

For the test application, the receiving system consisted of one receiver/processor along with four antenna ports and four channels that can each sample at up to 400 Msps. The receiver is a down-converting receiver, and the processor was a Virtex-5 FPGA. Data were sent to computer 16, which ran Matlab via Gigabit Ethernet. The receiver board contained two major components, namely, a front-end down conversion conversion component for sampling signals in the RF band, low noise amplification, and band pass filtering to approximately 90 MHz. The other component is a Multi-Channel Digital Synthesizer and Processor (MCDSP) board to further down-convert the RF signal to approximately 20 MHz, perform cell-phone energy detection algorithm, and send information to computer 16 via the Ethernet.

The hardware down-converts received RF signals to an IF frequency. It is capable of being configured in any of the cell phone bands in the U.S. by replacing RF filters (which are located in line with the receive antennae 20), and by providing a suitable local oscillator frequency (provided by a flexible signal generator in the current design).

Extensive testing consisted of transmitting with a modem for the selected locations within each room (1-20) of building 12. The average localization accuracy (percentage of identifying the correct room and the source of the wireless signal) for varying numbers of detecting signals and a number of positions in each room as calibration data is as shown in Table 1.

TABLE 1

Average location accuracy.

| Number of received signals | Number of sampled positions in each office | | |
|---|---|---|---|
| | 4 | 15 | 15 |
| ~30 | 50% | x | x |
| 1-3 | x | 60% | 60% |
| 10 | x | x | 80% |

Localization was deemed accurate if the software determined location of the transmitter within a neighborhood of three neighboring rooms (i.e., a transmission from room 8 is accurate if deemed to be from room 7, 8 or 9). It was found that sampling 15 positions in each room, and detecting the signal ten times, enabled predicting the neighborhood of the transmitter correctly in 80% of the time on average.

Figure 3:
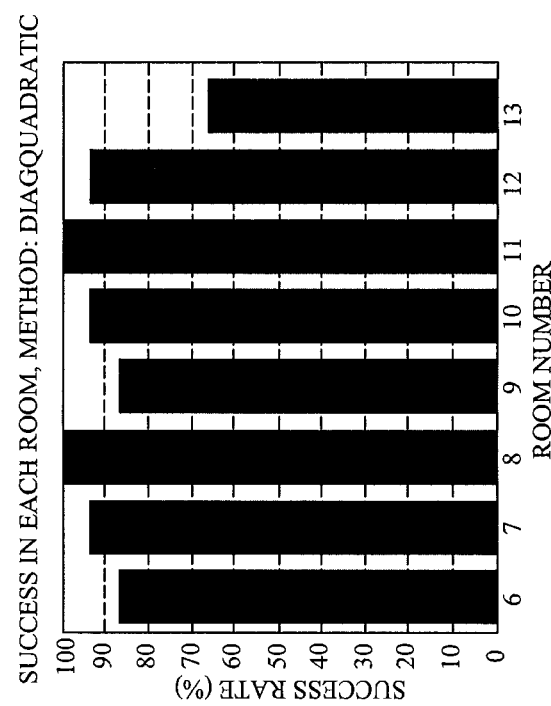
FIG. 3 is a bar graph depicting success rate for detection of the use of cell phones in various rooms in the building of FIG. 2.

FIG. 3 is a bar graph showing the success rate in identifying usage from the room or a neighboring room for seven different rooms (room numbers 6-13) in building 12. It is believed the lower success rate for room 13 is due to the fact its neighbors are not included in the test. Multiple testing in different rooms has shown similar results. It should be noted that classification accuracy is not affected significantly if calibration data taken from some time ago (two months) is used to classify signals detected currently. Accordingly, the system has shown accuracy of ±1 rooms/cells using recordings obtained over approximately three minutes of cell phone use.

While the invention has been taught with specific reference to these embodiments, one skilled in the art will recognize that changes can be made in form and detail without departing from the spirit and scope of the invention.

The invention claimed is:

1. A device for detecting wireless signals and locating the place of origin in a building, comprising:
    a transmitter system using a cellular protocol;
    a plurality of antennae that receive wireless Radio Frequency (RF) signals, each antenna having a port and one antennae is denoted as a reference antenna;
    a receiving system connected to the antennae ports with a plurality of cables, converting the RF signal to voltage waveform;
    a processing system in communication with the receiving system, detecting the strength of the received signals and Time Difference of Arrival of the RF signals with respect to antennae and determining the location where the wireless signals are being emitted by using classification algorithms, the processing system including preprocessing software that filters voltage signals and determines features of the voltage signals including signal strength and Time Difference of Arrival to the antennae with respect to the referenced antennae; and
    a human machine interface.

2. The device of claim 1, wherein the transmitter system is a modem(s) programmed through a computer to send out RF signals to provide training data sequences to the processing system.

3. The device of claim 1, wherein the receiving system has four channels and samples the RF signals and converts them to voltage using aliasing and band pass filtering.

4. The device of claim 1, further comprising communication means between the receiving system and processing system.

5. The device of claim 3, wherein the communication means is implemented using Gigabit Ethernet.

6. The device of claim 3, wherein the processing system consists of a computer and signal processing software.

7. The device of claim 6, wherein the signal processing software further includes classification software.

8. The device of claim 7, in which training data sequences are used to provide statistical information of features of voltage signal.

9. The device of claim 7, in which a supervised classification algorithm determines the location in which usage of the wireless device occurred.

10. The device of claim 1, in which a human machine interface sets an alarm and provides an operator with visual information of the location in which the wireless device has been used.

11. The method for detecting wireless singles and locating the place of origin in the building as set forth in claim 1, further including the step of providing indication means implemented using Gigabit Ethernet.

12. A method for detecting wireless singles and locating the place of origin in a building, comprising the steps of:
    providing a transmitter system that utilizes a cellular protocol;
    providing a plurality of antennae that receive Radio Frequency (RF) signals, each antenna having a port;
    placing the antennae at different locations spread throughout the building;
    providing a receiving system connected to the antennae ports;
    converting the RF signal to voltage waveform;
    providing a processing system in communication with the receiving system;
    detecting the strength of the received signals and Time Difference of Arrival of the RF signals with respect to the antennae;
    determining the location where the wireless signals are being omitted by utilizing classification algorithms;
    providing signal processing software including preprocessing software, filtering voltage signals through the preprocessing software, and determining features of voltage signals including signal strength and Time Difference of Arrival to the antennae with respect to a referenced antennae; and
    providing a human machine interface.

13. The method for detecting wireless signals and locating the place of origin in the building as set forth in claim 12, wherein the transmitter system is a modem(s) programmed through a computer, and further including the step of sending out RF signals to provide training data sequences to the processing system.

14. The method for detecting wireless singles and locating the place of origin in the building as set forth in claim 12, including the step of denoting one of the antennae as a reference antenna.

15. The method for detecting wireless singles and locating the place of origin in the building as set forth in claim 12, including the steps of providing four channels on the receiving system, and sampling the RF signals and converting the RF signals to voltage using aliasing and band pass filtering.

* * * * *